United States Patent
Anderson

[15] 3,696,873
[45] Oct. 10, 1972

[54] SOIL SAMPLING DEVICE
[72] Inventor: Gene A. Anderson, Midland, Mich.
[73] Assignee: The Dow Chemical Company, Midland, Mich.
[22] Filed: March 31, 1971
[21] Appl. No.: 129,781

[52] U.S. Cl. .................... 175/20, 175/135, 175/309
[51] Int. Cl. ........................ E21b 11/02, E21b 49/02
[58] Field of Search....175/19, 20, 58, 246, 248, 249, 175/309, 135

[56] References Cited

UNITED STATES PATENTS

| | | | |
|---|---|---|---|
| 2,416,501 | 2/1947 | Sundbergh | 175/19 X |
| 3,036,638 | 5/1962 | Parsons | 175/20 X |
| 3,095,051 | 6/1963 | Robinsky et al. | 175/248 X |
| 3,187,513 | 6/1965 | Guild | 175/19 X |
| 3,515,230 | 6/1970 | Tomaine | 175/20 X |

FOREIGN PATENTS OR APPLICATIONS

| | | | |
|---|---|---|---|
| 634,680 | 9/1936 | Germany | 175/20 |

*Primary Examiner*—David H. Brown
*Attorney*—Griswold & Burdick, V. Dean Clausen and Lloyd S. Jowanovitz

[57] ABSTRACT

Basic components of the device disclosed herein are a sample tube, driver sleeve, driver cap and driver head. The sample tube is a pipe which is split lengthwise into two semicircular sections. In assembled position, i.e. during the soil collecting function, the split sample tube is a unitary tube which fits inside a larger pipe that defines the driver sleeve. The driver cap is an internally threaded cup-shaped member with an upstanding solid stem thereon and a crosswise handle. The cap is secured to the upper end of the driver sleeve by external threads on the sleeve. The driver head is a one-piece member comprising a solid block, a hollow stem which fits over the solid stem of the driver cap, and loop-type handles. The loop handles enable the driver head to be lifted up and down, so that the driver stem can hammer down against the cap and thereby drive the sleeve and sample tube into the earth.

7 Claims, 3 Drawing Figures

PATENTED OCT 10 1972
3,696,873
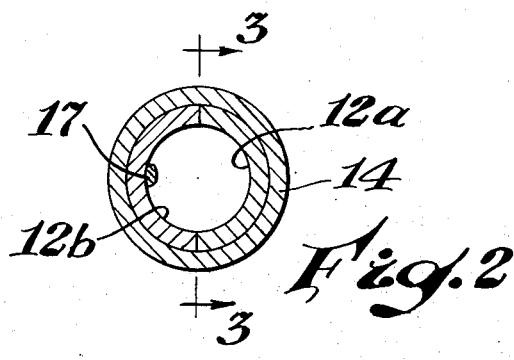
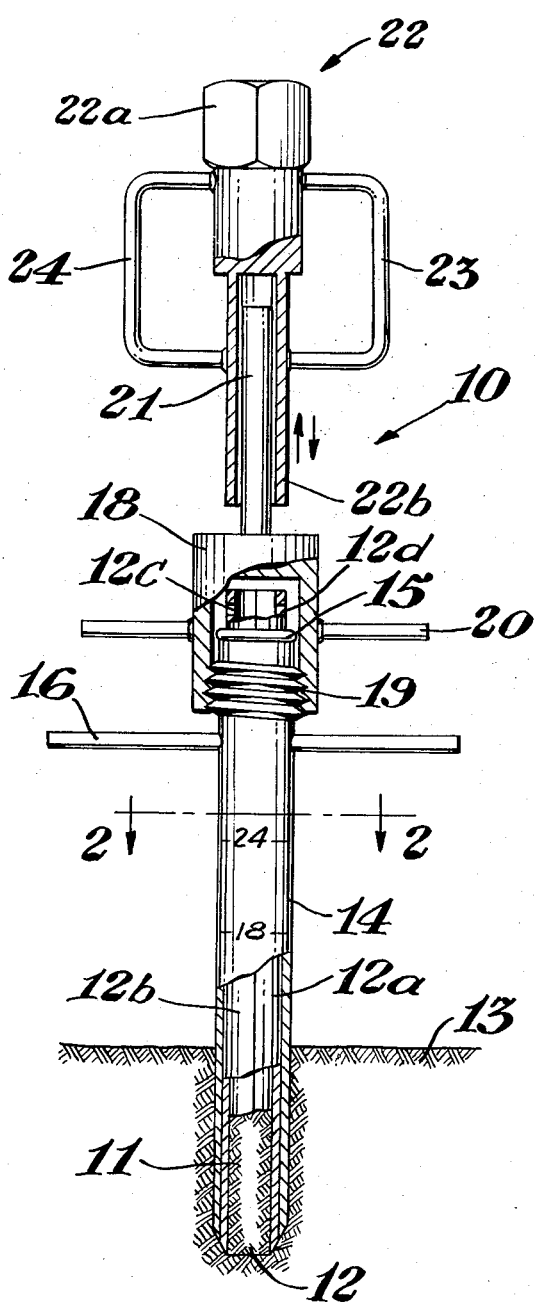
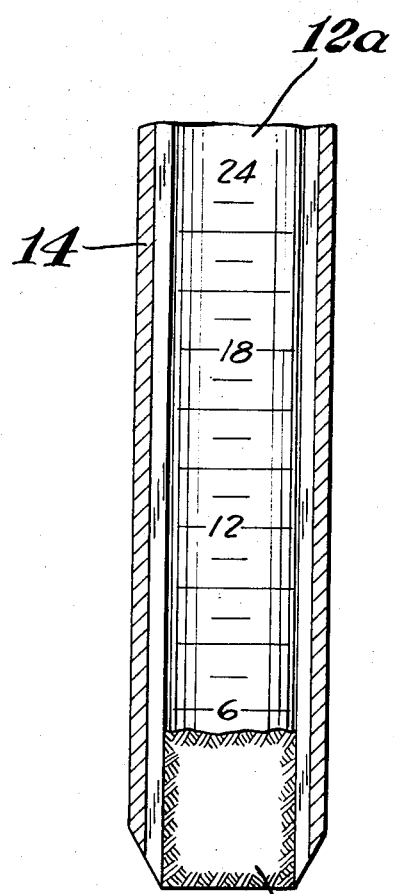
INVENTOR.
Gene A. Anderson
BY V. Dean Clausen
AGENT

3,696,873

SOIL SAMPLING DEVICE

BACKGROUND OF THE INVENTION

This invention relates to a device for collecting soil samples, the device being particularly adapted to minimize contamination of the samples which are obtained.

For various reasons, soils which are being prepared for planting, or the growing plants themselves, are treated with chemicals such as herbicides, pesticides and fertilizers. At some period of time after treatment, samples of the soil are collected and analyzed to determine the depth to which the chemical has penetrated the soil and the activity (persistence) of the chemical at different depths.

Several commercial devices are available for collecting soil samples. One such device is known as a nematode probe. The nematode probe is a T-shaped device having a hollow shank with an open end which is attached to a crosswise handle. Along one side of the shank is a lengthwise slot. A soil sample is obtained by pushing the probe into the ground, so that soil is forced up into the shank through the open end. When the probe is pulled upward out of the earth, the soil sample can be removed from the slot. A particular disadvantage of this device is that upon pulling the probe out of the ground the soil sample collected in the shank slot will scrape against the sides of the hole and thus become contaminated with "foreign" soil.

Another common soil sampling tool is an auger-type device. Soil samples are obtained at different depths, in sequence, by removing the first sample from the auger and then reinserting the auger in the same hole for the second sample and each succeeding sample. The auger probe has essentially the same drawback as the nematode probe; i.e. each time the probe is reinserted in the hole it will dislodge soil which contaminates the next sample. With either of the devices described above, therefore, it is virtually impossible to obtain an accurate analysis of the soil composition at different depths.

SUMMARY OF THE INVENTION

Accordingly, a broad object of the invention is to provide a soil sampling device which can collect soil samples at different depths without contaminating each sample with "foreign" matter.

Another object is to provide a soil sampling device which can collect several soil samples from different depths in a single operation.

In general, the soil collecting device of this invention comprises a sample tube, a driver sleeve, a driver cap and a driver head. The driver sleeve is a tubular member having an external fastening means on the upper end and a lower end suitable for driving into the soil. The sample tube is also a tubular member defined by separate, semicircular tube sections. In assembled position, the separate tube sections comprise a unitary sample tube which fits rotatably within the driver sleeve and is adapted to collect a soil sample. The driver cap is an inverted cup-shaped member which fits over and engages the upper end of the driver sleeve. An upstanding solid stem is positioned on the upper side of the cap. The sleeve and sample tube are driven into the earth by the driver head, which consists of a one-piece unit comprising a solid block with a hollow stem thereon which is adapted to fit over and slidingly engage the solid stem on the driver cap.

DESCRIPTION OF THE DRAWINGS

FIG. 1 is a front elevation view, partly in section, of one embodiment of the soil sampling device of this invention.

FIG. 2 is a cross section view of the device of FIG. 1, taken on line 2—2 of FIG. 1.

FIG. 3 is a vertical section view taken on line 3—3 of FIG. 2.

DESCRIPTION OF A PREFERRED EMBODIMENT

In the drawing, referring particularly to FIG. 1, the soil sampling device of this invention is indicated generally by numeral 10. In the position shown in FIG. 1, the device 10 is completely assembled and ready for the soil collecting function. Means for collecting a soil core 11 are provided by a sample tube, indicated generally by numeral 12, which consists of two separate, semicircular tube sections 12a and 12b. In the assembled position on device 10, the separate tube sections comprise a unitary tube 12, which is driven into a body of earth 13.

The sample tube 12 is carried into the earth 13 by a driver sleeve 14. Sleeve 14 is defined by a tubular member which is concentric with the sample tube and which completely encloses the sample tube. The outer diameter of sample tube 12 is slightly smaller than the inner diameter of driver sleeve 14, to enable the sample tube to rotate within the sleeve and thereby pick up one or more soil cores. The lower ends of both the sample tube 12 and driver sleeve 14 are formed with a chisel edge to facilitate penetration into the soil. Also, the lower end of sample tube 12 extends slightly below the lower end of sleeve 14, to provide good soil-digging point for the sample tube.

As indicated in FIG. 1, the upper end of sample tube 12 extends a short distance above the upper end of driver sleeve 14. The upper end of the sample tube is held in position above sleeve 14 by an annular ridge 15, which is positioned slightly below the upper end of tube 12, so that the ridge seats down against the upper end of sleeve 14. The upper end of tube 12 also includes holes 12c and 12d, which are positioned opposite each other in the tube. These holes are for the purpose of aiding in the removal of tube 12 from sleeve 14. For example, if the tube should stick in the sleeve after the soil core is collected, a screw driver or similar tool may be inserted through the holes to help pull the tube upwardly out of the sleeve. As shown in FIG. 2, a vertical rod 17 is secured to the inner wall surface of tube section 12b. As explained more fully hereinafter, the rod 17 has a particular function in retaining a core of sandy soil in the sample tube.

A crosswise handle 16 is positioned on the outside of sleeve 14 near the upper end thereof. Handle 16 can be used to steady the sleeve while it is being driven into the earth and it also provides a handle for pulling the sleeve upward out of the earth after the sample core is collected. An inverted cup-shaped member, having internal screw threads thereon, provides a driver cap 18 for sleeve 14. The driver cap 18 fits over the upper end of sleeve 14 and engages corresponding external threads 19, which are positioned slightly below the upper end of the sleeve. Driver cap 18 also includes an exterior crosswise handle 20, which facilitates removal of the cap from sleeve 14. Positioned on the upper side of cap 18 is an upstanding solid stem 21.

A driver head, generally indicated by numeral 22, provides means for driving the sleeve 14 and sample tube 12 into the earth 13. Driver head 22 is a one-piece unit which comprises a block 22a and a hollow stem portion 22b, which extends downwardly from the block. The inside diameter of stem portion 22b is slightly larger than the diameter of solid stem 21, so that stem 22b will fit over and slidingly engage the stem 21. Driver head 22 also includes handle members 23 and 24. Using handle members 23 and 24, the driver head is moved up and down, so that stem 22b hammers against the upper side of cap 18 to drive the device into the earth.

To illustrate the practice of the invention, the use of the present device in a typical soil collecting operation will now be described. In the assembled position shown in FIG. 1, the device 10 is driven into the earth 13 to a point at which the lower ends of sample tube 12 and sleeve 14 are about 6 inches below the surface. The distance to which the sample tube penetrates the earth, i.e. the penetration point, can be determined from a scale, which is graduated in inches and is inscribed on the outer wall surface of sleeve 14. Leaving the driver sleeve 14 in the ground, the driver head 22 is removed from cap 18 and the cap is removed from sleeve 14. The distance from the top edge of sample tube 12 to the top of the soil core in the tube is then measured and the distance is recorded. Cap 18 is put back on sleeve 14 and the sleeve is driven down to the 12-inch mark. The driver head and cap are again removed, the distance from the top edge of tube 12 to the top of the soil core is measured, and the distance is recorded. Cap 18 is again put back on sleeve 14 and the sleeve is driven down to the 18-inch mark.

After sleeve 14 is driven to the 18-inch depth, the sample tube 12 is held together as a one-piece unit and pulled upward out of sleeve 14. Sample tube 12 is then taken apart carefully, so that the entire soil core remains intact in one of the tube sections. The first distance recorded is subtracted from the over-all length of sample tube 12 to obtain the length for the first core sample. The second distance is also subtracted from the over-all length of the sample tube to obtain the length of the second core sample. The individual lengths obtained for each sample core are then measured off on the intact core, i.e. measuring from the top of the core itself. Each soil core increment can then be split off with a knife or similar tool and the respective samples transferred to separate containers for analysis.

In practice, it was found that compression of the soil core in sample tube 12 will depend on moisture content, texture and type of soil being sampled. From a special experiment it was concluded that compression of the soil occurs only as the soil first enters the sample tube upon being driven into the earth. In other words, compression of the soil core from drag or friction on the walls of the sample tube is insignificant. Therefore, in a given plot of soil the correlation between the penetration distance of sleeve 14 and the length of the soil core in sample tube 12 will be constant. To illustrate, if sleeve 14 is driven into a clay ground, for example, the length of the core in tube 12 (the sample) may be 4 inches for each 6-inch increment on the sleeve. Once the compression ratio for a given type of soil is established, therefore, the sleeve may be driven into the ground to whatever distance is desired and the length of the soil core in the sample tube will be in direct relation to each increment measured on the sleeve.

Generally speaking, the soil core will remain compacted in the sample tube 12 when the tube is pulled out of driver sleeve 14. An exception is sandy soil, which has a tendency to fall out of the sample tube, presumably because of the consistency of the soil. The problem is alleviated, however, by rod 17, which is attached to tube section 12b. For example, after the sample tube 12 is driven to the desired depth in sandy soil, the tube is rotated about a half turn before pulling it out of sleeve 14. As rod 17 is rotated, it severs the compacted soil core in the sample tube from the soil directly beneath the point of the sample tube, so that the core remains in the tube when the tube is raised.

With regard to fabrication, the driver head is preferably constructed of a heavy metal, such as cast steel. For simplicity and durability, the driver cap, the sleeve, and the sample tube are preferably constructed of metals, such as cast steel, iron pipe, or the like. The actual dimensions and weight of each piece are not critical and are determined primarily by the particular soil sampling operation to be performed.

What is claimed is:

1. Apparatus for collecting samples of soil, which comprises, in combination:
    a. a driver sleeve defined by a tubular member having an upper and lower end, wherein an external fastening means is positioned slightly below the upper end and the lower end is adapted to be driven into the soil,
    b. a sample tube defined by at least two separate, semicircular tube sections which, in the assembled position on the apparatus, comprise a unitary tube, which is rotatable within said driver sleeve and is adapted to receive and retain a sample of soil,
    c. a driver cap defined by an inverted cup-shaped member which fits over the upper end of the driver sleeve and which engages the external fastening means of the sleeve, the cap including an upstanding solid stem positioned on the upper side thereof,
    d. a driver head defined by a solid block of material with a hollow stem portion which extends downwardly therefrom, the said hollow stem portion being adapted to fit over and slidingly engage the solid stem of the driver cap.

2. The apparatus of claim 1 wherein the external fastening means of the driver sleeve comprises external threads and the driver cap has internal screw threads which are adapted to threadably engage the sleeve threads.

3. The apparatus of claim 1 wherein the upper end of the unitary sample tube extends a short distance above the upper end of the driver sleeve, the said upper end including a continuous annular ridge adapted to seat against the upper end of the driver sleeve.

4. The apparatus of claim 1 wherein the lower end of the sample tube extends slightly below the lower end of the driver sleeve.

5. The apparatus of claim 1 in which the driver sleeve includes a handle means.

6. The apparatus of claim 1 in which the driver cap includes a handle means.

7. The apparatus of claim 1 in which the driver head includes a handle means.

* * * * *